(12) United States Patent
Fujii

(10) Patent No.: US 7,739,786 B2
(45) Date of Patent: Jun. 22, 2010

(54) APPARATUS FOR MANUFACTURING MAGNETIC HEAD SLIDER

(75) Inventor: Ryuji Fujii, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 563 days.

(21) Appl. No.: 11/425,882

(22) Filed: Jun. 22, 2006

(65) Prior Publication Data

US 2006/0292968 A1   Dec. 28, 2006

(30) Foreign Application Priority Data

Jun. 24, 2005   (JP) ............................. 2005-184561

(51) Int. Cl.
 *G11B 5/127* (2006.01)
(52) U.S. Cl. .............. 29/603.16; 29/603.12; 29/603.13; 29/603.15; 29/603.03
(58) Field of Classification Search .................. 29/737, 29/603.03, 603.09, 603.05, 603.12, 603.19, 29/603.13–603.16; 451/54, 69
See application file for complete search history.

(56) References Cited

U.S. PATENT DOCUMENTS

| | | | | |
|---|---|---|---|---|
| 4,951,381 | A * | 8/1990 | Yamazaki et al. | 29/603.08 |
| 5,037,593 | A * | 8/1991 | Okuyama et al. | 65/43 |
| 5,406,694 | A | 4/1995 | Ruiz | |
| 5,722,156 | A * | 3/1998 | Balfrey et al. | 29/603.08 |
| 6,295,719 | B1 * | 10/2001 | Strom | 29/603.12 |
| 6,332,264 | B1 * | 12/2001 | Itoh et al. | 29/603.12 |
| 6,551,438 | B1 * | 4/2003 | Tanemura | 156/265 |
| 6,595,845 | B1 * | 7/2003 | Mizuno et al. | 451/548 |
| 6,609,965 | B2 * | 8/2003 | Fujioka | 451/547 |
| 6,687,976 | B1 * | 2/2004 | Koyama et al. | 29/603.12 |
| 6,756,287 | B2 * | 6/2004 | Khlif et al. | 438/460 |
| 2006/0157200 | A1 | 7/2006 | Ito et al. | |
| 2006/0157442 | A1 | 7/2006 | Ito et al. | |
| 2006/0157447 | A1 | 7/2006 | Ito et al. | |

FOREIGN PATENT DOCUMENTS

| | | |
|---|---|---|
| CN | 1291768 | 4/2001 |
| JP | 8-315344 | 11/1996 |

(Continued)

OTHER PUBLICATIONS

English language Abstract of JP 9-007149.
English language Abstract of JP 8-315344.
English language Abstract of JP 11-316928.
English language Abstract of JP 11-328642.

(Continued)

*Primary Examiner*—Derris H Banks
*Assistant Examiner*—Tai Nguyen
(74) *Attorney, Agent, or Firm*—Greenblum & Bernstein, P.L.C.

(57) ABSTRACT

An apparatus and a method for manufacturing a magnetic head slider are to improve product quality of the magnetic head slider while simplifying the process and reducing the manufacturing time. The apparatus includes: holding devices for holding the both ends of a block member of an array of the magnetic head sliders respectively; a cutting device for cutting out a potion in which the magnetic head sliders are to be formed from the block member; and a cut surface treatment device having cut surface treating parts on the front and back surfaces of the cutting device for treating cut surfaces opposite to each other which form the predetermined two cut surfaces of the magnetic head sliders.

3 Claims, 12 Drawing Sheets

FOREIGN PATENT DOCUMENTS

| | | |
|---|---|---|
| JP | 9-007149 | 1/1997 |
| JP | 11-316928 | 11/1999 |
| JP | 11-328642 | 11/1999 |
| WO | 00/39801 | 7/2000 |

OTHER PUBLICATIONS

U.S. Appl. No. 11/420,507 to Murakoshi, which was filed on May 26, 2006.

English language Abstract of CN 1291768, Apr. 18, 2001.

* cited by examiner

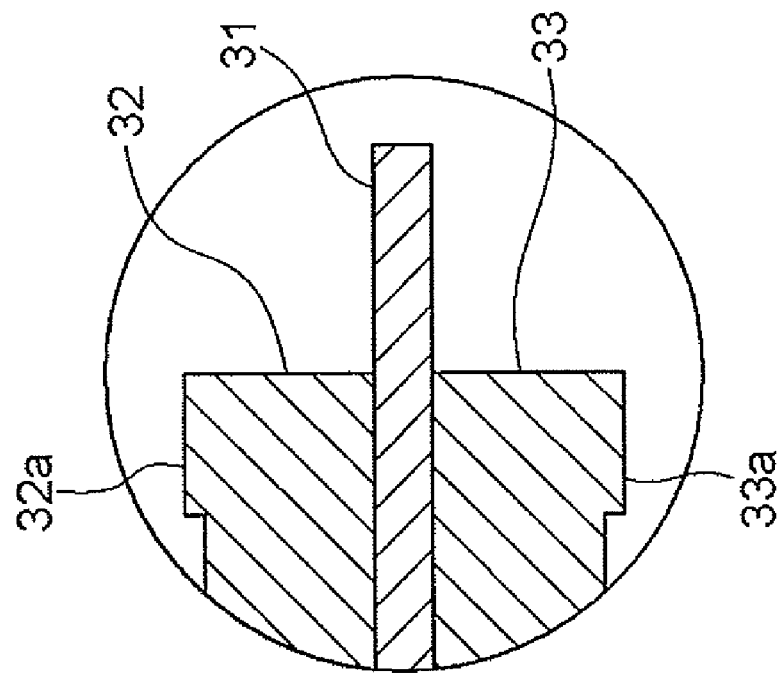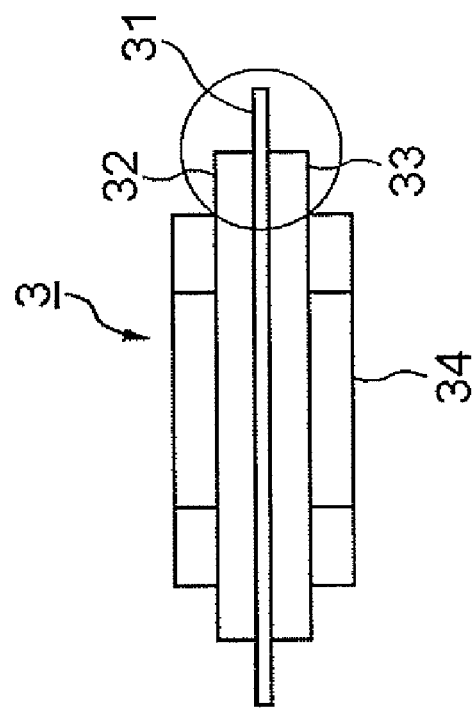

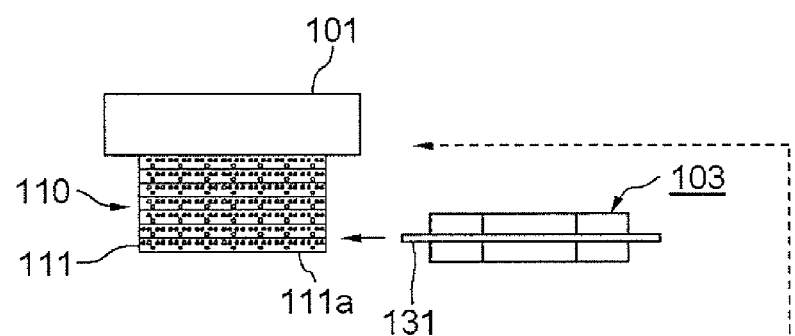
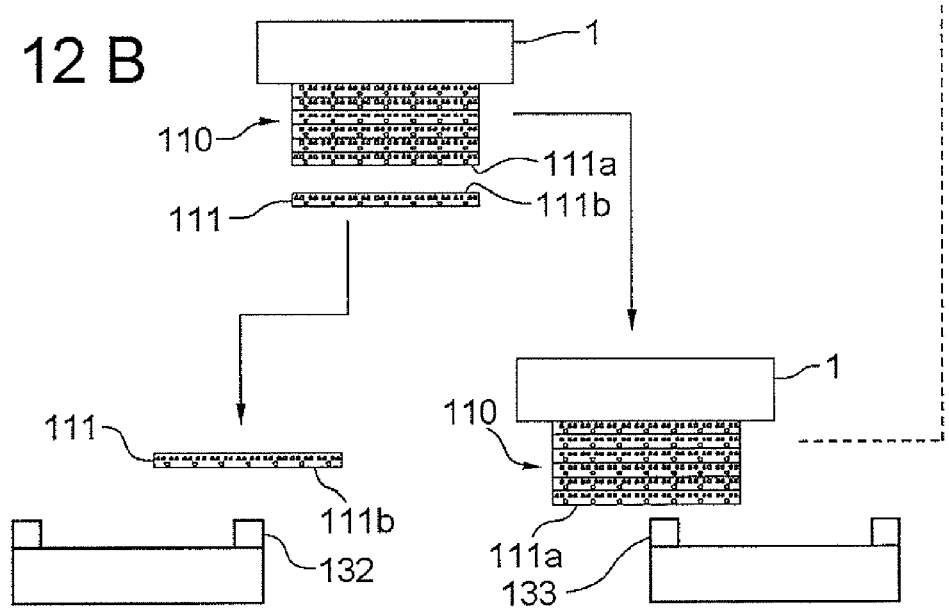
FIG. 12A
FIG. 12 B
FIG. 12C
FIG. 12D

APPARATUS FOR MANUFACTURING MAGNETIC HEAD SLIDER

BACKGROUND OF THE INVENTION

1. Field of the Invention

The present invention relates to an apparatus and a method for manufacturing magnetic head sliders, in particular, including surface treatment.

2. Related Art

A magnetic head slider used for a hard disk drive is required to fly at a low amplitude above a magnetic disk with high accuracy. To achieve that, an ABS ((Air Bearing Surface) flying surface) in a predetermined shape must be formed on the surface of the magnetic head facing the magnetic disk, and the surface must be treated by polishing (lapping) with high accuracy. At the same time, in polishing, the MR height (length of the Magnet-Resistive element from the ABS) of the magnetic head slider would be adjusted so as to read and write data on the magnetic disk. Since the reading and writing performance to the magnetic disk depend strongly on the MR height, highly accurate adjustment of the MR height is needed.

For those reasons, polishing the ABS is one of important steps while processing the magnetic head slider. Further, the surface opposite to the ABS (back surface) of the magnetic slider is to be attached onto a suspension constituting a Head Gimbal Assembly (HGA). Therefore, if the surface roughness of the back surface is big, the magnetic head slider cannot be attached onto the suspension with high accuracy, so the flying height above the magnetic disk and the flying posture angle may be affected. In addition, the back surface is also required to have parallelism with the ABS. This is because the parallelism between the surface to be mounted on the suspension and the ABS affects the flying posture angle of the magnetic head slider, so it causes the flying height of the magnetic head slider to fluctuate. Therefore, polishing the back surface of the ABS with highly accuracy is also required.

Conventional method of manufacturing magnetic head sliders including polishing the ABS and its back surface will be explained. In the method disclosed in the specification of the U.S. Pat. No. 5,406,694 (Patent Document 1), a wafer block, an array of the magnetic head sliders aligned in rows and columns, is cut out from a wafer on which magnetic head elements of a plurality of magnetic head sliders are formed. Then, while holding the both end sides of the wafer block with jigs, a bar block which is a row of the magnetic head slider in the wafer block is cut out from the wafer block. Then, an ABS of magnetic head slider formed on the cutting surface of the bar block is polished by a dedicated device. Then, pattern is formed on the ABS through steps of etching the ABS, the bar block would be cut into pieces of magnetic head sliders, whereby magnetic head sliders are manufactured.

Methods disclosed in the pamphlet of International Publication No. WO00/39801 (Patent Document 2), Japanese Patent Laid-Open Publication No. 9-7149 (Patent Document 3), and Japanese Patent Laid-Open Publication No. 8-315344 (Patent Document 4) adopt such methods that with respect to a bar block cut out from a wafer block in the same way as described above, both ABS and its back surface are sandwiched by grindstones and polished simultaneously, or the front and back surfaces are polished separately.

However, as hard disk drive has been shrunk in the size recently, the size of a magnetic head slider also has been further shrunk. Therefore, in the manufacturing process, handling such as fixing a member in a bar-block shape to a jig and polishing it is getting more difficult. In particular, direct handling of the minute and elongated fragile bar block would induce considerable damage to the magnetic head slider.

In view of the above, as shown in Japanese Patent Laid-open Publication No. 11-316928 (Patent Document 5) and Japanese Patent Laid-open Publication No. 11-328642 (Patent Document 6), methods including polishing ABS before cutting into a bar block have been disclosed. More specifically, in the method disclosed in Patent Document 5, first of all, wafer block in which magnetic head sliders are arranged in a plurality of rows of bar blocks is cut out, and is mounted on a support plate. Next, ABS of magnetic head sliders positioned at the end thereof is polished. Then, a tape is used so as to cover the polished ABS, and the bar block is cut out from the wafer block in such a state. Then, the bar block is held with vacuum tweezer and mounted on a jig for polishing the back surface, and the back surface is polished. The method disclosed in Patent Document 6 is same as that described above. First of all, ABS is polished in a wafer block state, and a bar block is cut out. After that, the bar block is adhered to a work holder with the ABS being the adhered surface, and the back surface is polished.

The above-described methods will be explained briefly with reference to FIGS. 12A to 12D. First of all, as shown in FIG. 12A, a wafer block 110 is held by a holding jig 101, and a bar block 111 positioned at the end face is cut out by a cutting grindstone 131 provided to a cutting device 103 (FIG. 12B). Note that the ABS which is an end face 111a of the cut-out bar block 111 has been polished previously in the step shown in FIG. 12D described later. Then, to the cut-out bar block 111, the back surface which is the cut surface 111b is polished by a polishing grindstone 132 as shown in FIG. 12C. On the other hand, to the remaining wafer block, the ABS 111a of the next bar block positioned at the cut surface is polished by a polishing grindstone 133 as shown FIG. 12D, and then cutting process of FIG. 12A is repeated.

[Patent Document 1] U.S. Pat. No. 5,406,694
[Patent Document 2] WO00/39801
[Patent Document 3] JP9-7149A
[Patent Document 4] JP8-315344A
[Patent Document 5] JP11-316928A
[Patent Document 6] JP11-328642A However, the conventional examples described above involve the following disadvantages. In the art, because polishing of ABS or back surface is performed after cutting into a bar blocks it is still necessary to handle the elongated fragile bar block directly. It may cause the damage of magnetic head sliders. In addition, considerable process such as mounting of the minute fragile bar block on a predetermined jig is necessary. In other words, in manufacturing magnetic head sliders which needs high process quality, it may cause problems of complication and delay of the manufacturing process, leading to the product quality's deteriorating easily.

SUMMARY OF THE INVENTION

It is therefore an object of the present invention to provide an apparatus and a method for manufacturing magnetic head sliders capable of solving the disadvantages of the art, and in particular, improving the product quality, simplifying the manufacturing process and reducing the manufacturing time.

An apparatus for manufacturing magnetic head sliders in the present invention is for manufacturing magnetic head sliders formed by cutting out from a block member, comprising holding devices for holding the both ends of the block member, respectively, a cutting device for cutting out a portion in which magnetic head sliders are to be formed from the block member, and a cut surface treatment device having cut surface treating parts on the front and back surfaces thereof for treating cut surfaces opposite to each other which form predetermined two surfaces of magnetic head sliders.

In the present invention, a block member is held by two holding devices at the both ends, and cutting the block member in a state where the both ends are held, it is divided into a cut-out portion and the remaining portion (block member). After cutting, the cut-out portion and the remaining portion have been still held by the holding devices in a state where the cut surfaces are opposite to each other. Keeping the condition, the cut surface treating parts provided on the front and back surfaces of the cut surface treatment device are simultaneously treated so as to face the respective cut surfaces to thereby treat the respective cut surfaces.

In the way, both the opposite cut surfaces formed by cutting can be treated in just one step by using only one device after cutting. Therefore, it is possible to simplify the manufacturing process and to reduce the manufacturing time. In particular, in the conventional process, three steps were necessary, to cut a bar block out and to treat two cut surfaces of it respectively, so the position of a treatment device has adjusted by using a camera or the like with process markers marked on the wafer in each step. However, in the present invention, it is only necessary to carry out such adjustment once before cutting. Consequently, when treating cut surfaces after cutting, it is only necessary to move the treatment device for cut surfaces with high accuracy with reference to the position of cutting. Thereby, it is possible to simplify the manufacturing equipment and to reduce the manufacturing time, leading to reduction in the manufacturing cost.

Further, since cutting and treating of the cut surfaces are performed while holding a portion in which magnetic sliders are formed, it is possible to prevent handling and treating of the cut-out portion separately to thereby stabilize the quality of the process, so damage on the product can be prevented. Accordingly, it is possible to manufacture magnetic head sliders of high quality at low cost.

Further, when the cut surface treatment device treats the cut surfaces, the holding devices hold the block member and the cut-out portion respectively such that the distance between the cut surfaces opposite to each other is set almost same as the distance between the cut surface treating parts of the cut surface treatment device.

Thereby, by inserting the cut surface treatment device between the cut surfaces opposite to each other held with a distance almost same as that between the cut surface treating parts, the cut surface treating parts contact or come close to the cut surfaces, respectively. Therefore, it is possible to treat the respective cut surfaces almost simultaneously to thereby further speed-up the treating step.

Further, the cutting device is provided between the cut surface treating parts formed on the front and back surfaces of the cut surface treatment device. Thereby, after cutting by the cutting device, the cut surfaces can be treated by using the cut surface treatment device provided on the both sides thereof. That makes it possible to simplify the manufacturing apparatus, to treat the cut surfaces immediately after cutting and to reduce the manufacturing time.

Further, the cut surfaces are an ABS and a back surface of magnetic head sliders respectively, and the cut surface treating parts included in the cut surface treatment device are polishing parts. By using them for polishing surfaces of the magnetic head sliders particularly as described above, it is possible to treat the surfaces with high accuracy.

Further, a polishing device which is another mode of the present invention is a polishing device for polishing surfaces of magnetic head sliders formed by cutting out from a block member, including cut surface treating parts on the front and back surfaces thereof for polishing cut surfaces opposite to each other which form predetermined two surfaces of magnetic head sliders provided by cutting out the block member. The polishing device further includes a cutting device for cutting the block member, between the cut surface treating parts formed on the front and back surfaces of the polishing device.

Further, a method of manufacturing magnetic head sliders, which is another mode of the present invention, is a method of manufacturing magnetic head sliders formed by cutting out from a block member, comprising the steps of: holding the both ends of the block member, respectively (holding step); and while maintaining the holding state by the holding step, cutting a portion, in which magnetic head sliders are to be formed, from the block member, and treating cut surfaces opposite to each other which form predetermined two surfaces of magnetic head sliders, respectively (cut surface treating step).

In the cut surface treating step, the cut surfaces are treated simultaneously. According to the method mentioned above, same actions and effects as the manufacturing apparatus mentioned above can be obtained.

Further, in the holding step of the above-mentioned method, the block member having one of the cut surfaces, treated in the cut surface treating step of another manufacturing process, at one end part thereof is held. Since the end of the cut-out side of the block member is held in the treated state, the treated surface can be protected, and a portion cut out and gone through the cut surface treating step becomes a state where the both surfaces are treated. Thereby, it is possible to obtain products treated rapidly.

EFFECTS OF THE INVENTION

The present invention is configured and worked as described above. Thereby, in the process of manufacturing magnetic head sliders, two cut surfaces formed by cutting can be treated in one step by using one cut surface treatment device, so it is possible to simplify the manufacturing step and to reduce the manufacturing time. Further, since cutting and treating of the cut surfaces are performed while holding the member, it is possible to stabilize the treating and to prevent damage on the product. Further, by performing positioning once before cutting, positioning is not required any more when treating the cut surfaces thereafter. This leads to reduction in the manufacturing time and simplification of the manufacturing equipment. Thereby, the present invention has such an excellent effect as to manufacture magnetic head sliders of high quality at low cost, which could not be achieved conventionally.

BRIEF DESCRIPTION OF THE DRAWINGS

FIGS. 1A and 1B are illustrations for explaining manufacturing objects, in which FIG. 1A shows a wafer and FIG. 1B shows a wafer block;

FIG. 8A is a diagram showing the configuration of the treatment device disclosed in FIG. 6, and FIG. 8B is a partially enlarged sectional view thereof;

FIGS. 12A to 12D are illustrations showing a conventional method of manufacturing magnetic head sliders.

DESCRIPTION OF PREFERRED EMBODIMENTS

An apparatus and a method for manufacturing magnetic head sliders, which are the present invention, are characterized in that a portion in which magnetic head sliders are to be formed is cut out from a block member, and two cut surfaces formed by cutting are treated in one step. Hereinafter, specific configurations and a method will be described with reference to the embodiments.

The apparatuses and methods in the present invention are not limited to manufacturing the magnetic head sliders. For example, they can be used for manufacturing other electronic components including cutting out from a block member and treating two cut surfaces.

Embodiment 1

Figure 1A:
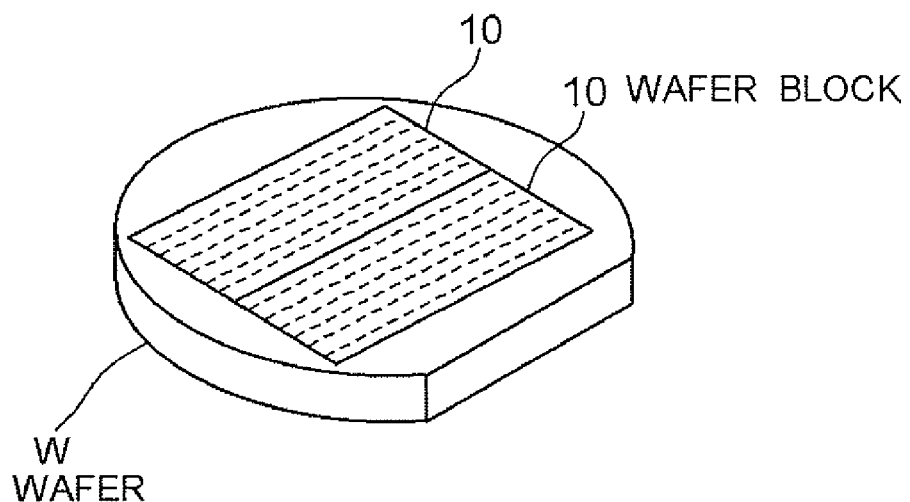
Figure 1B:
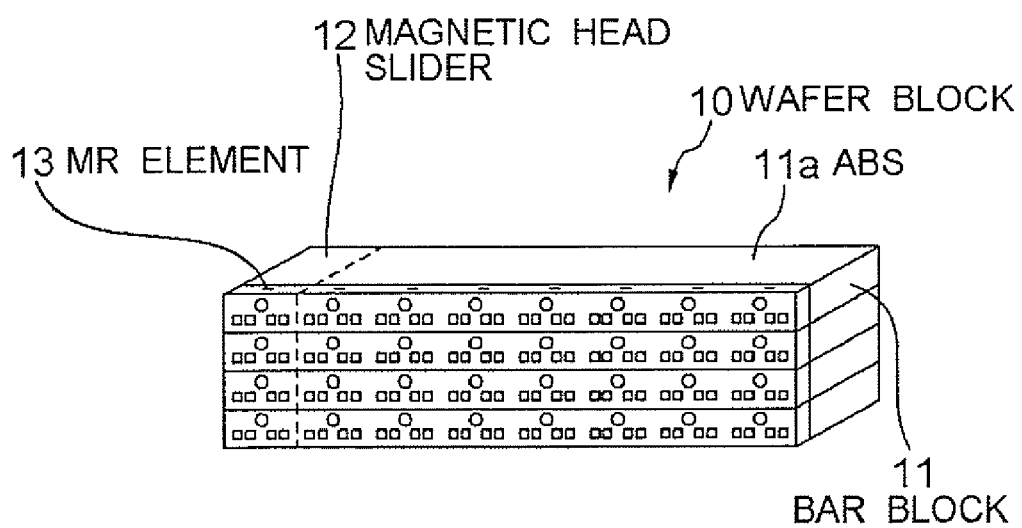
Figure 10:
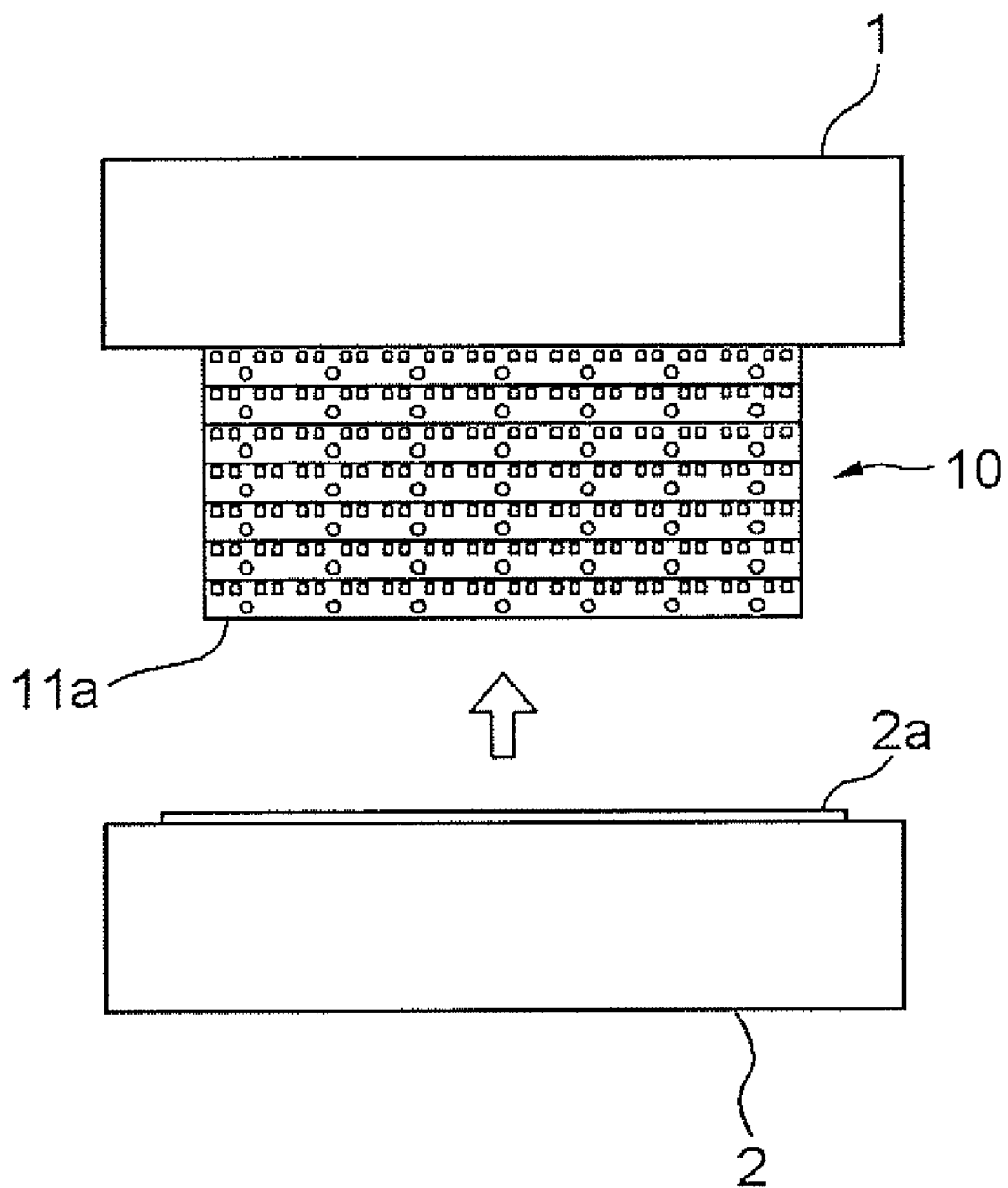
FIG. 10 is a configuration diagram of the apparatus for manufacturing magnetic head sliders, showing a state of holding an end face of the wafer block after treating the cut surfaces.
Figure 11:
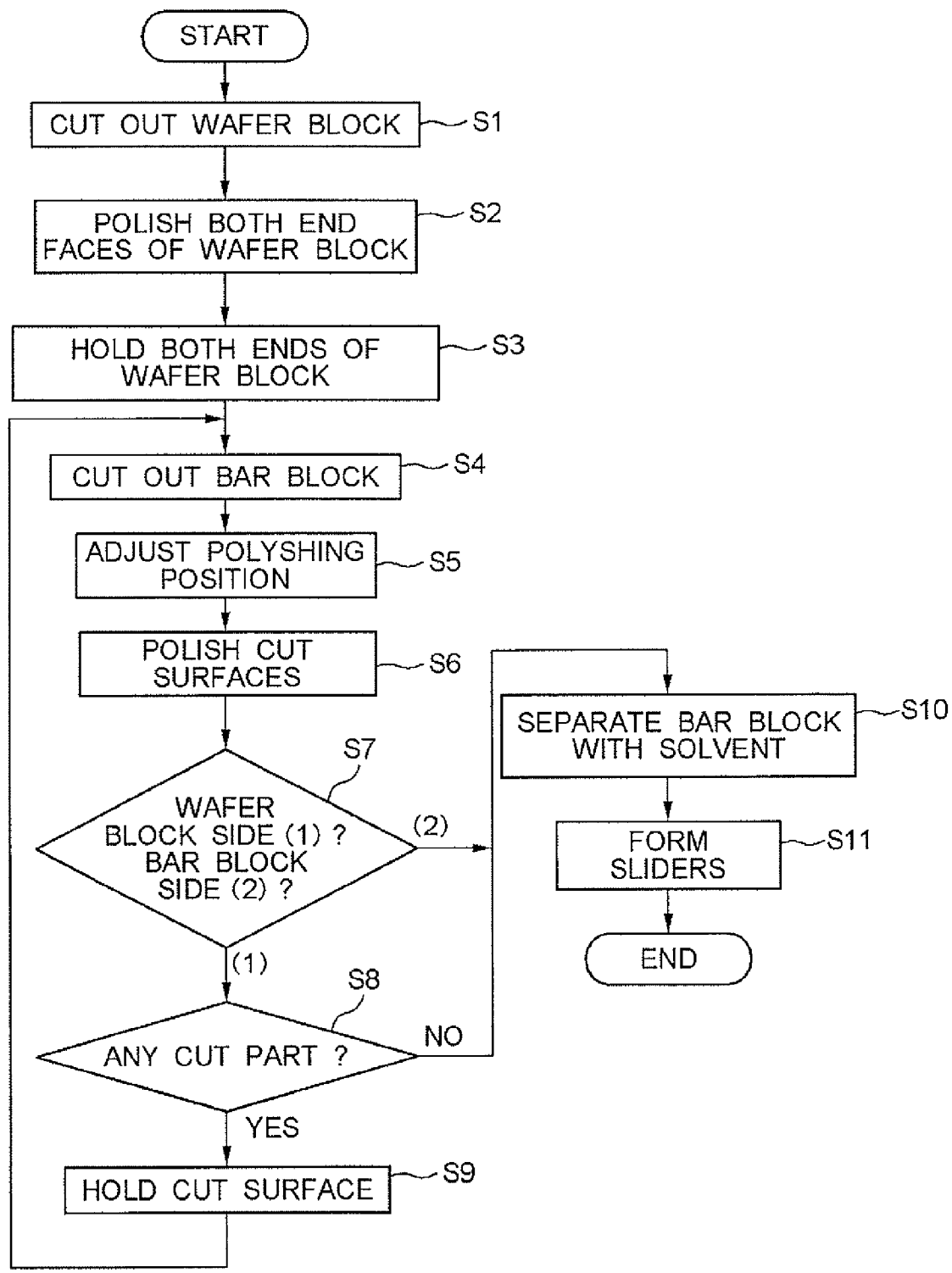
FIG. 11 is a flowchart showing a method of manufacturing magnetic head sliders.

The first embodiment of the present invention will be described with reference to FIGS. 1A to 11. FIGS. 1A and 1B are diagrams showing processing objects processed to be magnetic head sliders. FIGS. 2 to 10 are diagrams showing an apparatus and a method for manufacturing magnetic head sliders. FIG. 11 is a flowchart showing a method of manufacturing magnetic head sliders.

[Configuration]

The apparatuses for manufacturing magnetic head sliders in the present invention are for manufacturing pieces of magnetic head sliders in such a way that a wafer block 10 (block member) shown in FIG. 1B consisting of bar blocks 11 arranged in rows, in each of which a plurality of magnetic head sliders 12 are aligned in a row, is cut out from a wafer W shown in FIG. 1A, and the wafer block 10 is processed. The apparatus for manufacturing magnetic head sliders particularly has such a configuration that the bar block 11 is cut out and the cut surfaces are treated, which is a characteristic of the present invention.

More specifically, the apparatus for manufacturing magnetic head sliders of the present embodiment includes: a first holding jig 1 (holding device) for holding one end side of the wafer block 10; a second holding jig 2 (holding device) for holding the other end side of the wafer block 10; and a processor 3 (cutting device, cut surface treatment device) for cutting the wafer block 10 and treating the cut surfaces, as shown in FIGS. 2 to 10. In addition, the apparatus further includes a hold releasing device 4 for releasing a holding state of the member held by the holding jigs 1 and 2 after cutting and treating the cut surfaces. Hereinafter, each configuration will be described in details.

<Wafer Block>

The magnetic head sliders 12 are formed such that magnetic head element parts are formed by laminating a thin film on the wafer W and are cut into pieces. In order to do so, the wafer block 10 consisting of arranged bar blocks 11 in rows, in each of which a plurality of magnetic head sliders 12 are aligned laterally in a row, is cut out as described above. The wafer block 10 is then cut into bar blocks 11, and finally, cut into pieces of magnetic head sliders 12 from the bar blocks 11. FIG. 1A shows the wafer W before the wafer block 10 is cut out, and FIG. 1B shows the cut-out wafer block 10.

One end face 11a of the wafer block 10 serves as an ABS of a magnetic head slider 12 formed from the bar block 11 positioned at the end part, that is, a flying surface facing a magnetic disk. Accordingly, on the ABS 11a, an MR element 13 for performing reading and writing of data to a magnetic disk is exposed in a magnetic head element part formed at an edge of the magnetic head slider 12. In order to adjust the MR height (element length from the ABS) of the MR element 13, polishing of the end face is performed as described below. Further, the bar blocks 11 are cut out one by one from the end part of the wafer block 10, as described later. Note that in FIG. 2 and after, up and down of the wafer block 10 shown in FIG. 1B is shown reversely, so explanation will be given by showing the surface serving as the ABS 11a at the lower side.

<First Holding Jig>

Figure 2:
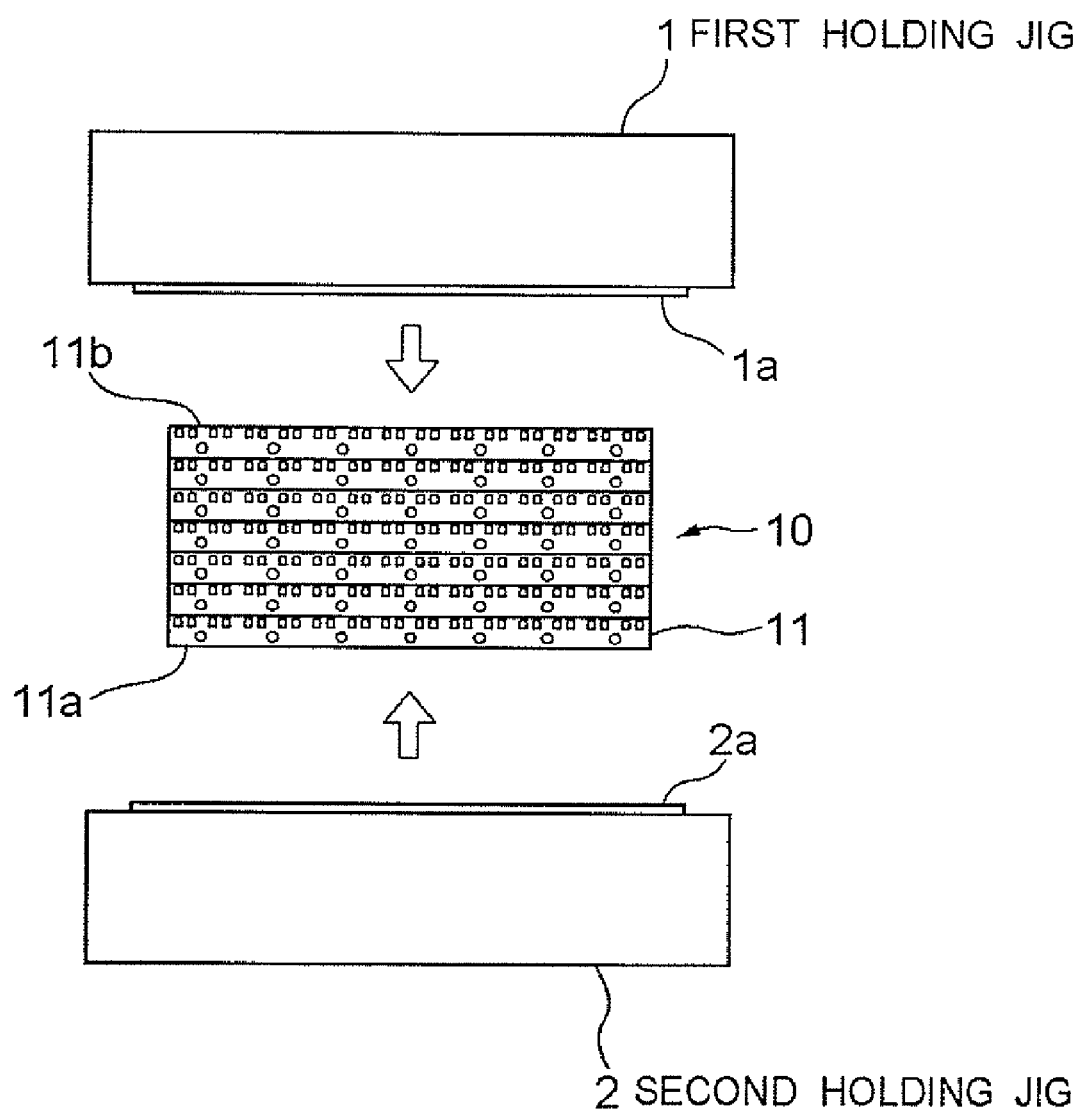
FIG. 2 is a configuration diagram of an apparatus for manufacturing magnetic head sliders, showing a state of holding end faces of a wafer block.

As shown in FIG. 2, in the wafer block 10, an end part (the other end part) opposite to the end part where the ABS 11a is formed (that is, the back surface 11a of the ABS 11a) is held by the first holding jig 1. The holding jig 1 is provided with a double-faced tape 1a on the holding face. To the double-faced tape 1a, the other end face (back surface 11b) of the wafer block 10 is adhered, whereby the wafer block 10 is held by the holding jig 1.

Further, although not shown, a driving device and a controlling device for drive-controlling the first holding jig 1 are also provided. The first holding jig 1 is moved such that the holding face, to which the double-faced tape 1a is adhered, contacts the other polished end face 11b of the wafer block 10, as shown by an arrow in FIG. 2. Thereby, the holding face of the holding jig 1 and the other end face 11b (back surface) of the wafer block 10 are adhered to each other with the double-faced tape 1a, so the bar block 11 on the other end face 11b side of the wafer block is fixedly held by the holding jig 1.

Further, the driving device and the controlling device mentioned above move-control the first holding jig 1 mainly in an up and down direction so as to control positioning when cutting and treating cut surfaces, as described later.

Note that the back surface 11a which is the other end face of the wafer block 10 held by the first holding jig 1 is polished by using a polishing device not shown before being held. More specifically, the surface serving as the back surface opposite to ABS of the magnetic head slider 12 is polished while fixing the wafer block 10 to a predetermined jig. Since the wafer block 10 is in a large shape when the back surface is treated, even though the wafer block 10 is fixed with a cramp-type jig, it is possible to prevent damage which may be caused by the jig. Here, any holding method is acceptable, so the wafer block 10 may be held such that a part other than that to be treated is adhered with a double-faced tape.

The double-faced tape 1a has an area covering at least the other end face 11b of the wafer block 10, that is, all over the back surface 11b previously treated, and is adhered so as to cover the back surface 11b. Thereby, the double-faced tape 1a covers all over the polished back surface 11b, serving as a protective member for preventing damage on the back surface 11a.

Further, the double-faced tape 1a is made of an elastic member having predetermined elasticity. Thereby, the treated back surface 11b can be further protected appropriately. However, it is desirable that the elasticity and elastic range of the double-faced tape 1a be in a level not affecting treatment of the surface opposite to the back surface 11b (ABS 11a) described later. Further, the double-faced tape 1a is a conductive member, and corresponding to it, the first holding jig 1 is also a conductive member. Therefore, it is possible to suppress generation of electrostatic discharge damage of the wafer block 10 held, that is, of the magnetic head sliders 12.

Further, the double-faced tape 1a is a member which is separated when prescribed solvent is added since the adhesive strength is weakened. This is for easily separating the remaining bar block 11 from the holding jig 1 by using solvent as described later.

Although an example of using the double-faced tape 1a for holding the other end face 11a of the wafer block 10 has been described, the present invention is not limited to this. Instead of the double-faced tape 1a, the wafer block 10 may be adhered to the first holding jig 1 by using another adhesive member such as an adhesive having the above-described characteristics (e.g., characteristic of separating by solvent). It is desirable that a substituting adhesive member have the characteristics held by the double-faced tape 1a, but it is not limited to have the above-described characteristics.

For example, as an adhesive member, thermoplastic resin having less adhesive stress and capable of adhering and separating by heating easily and repeatedly (plasticizing temperature is 50 to 150° C.) may be used. Thermoplastic resin is solid at room temperature, so adhesion is performed in a melted state by heating and then cooled to the room temperature.

Further, as a configuration for holding the other end of the wafer block 10, a physical device such as a vacuum chuck or an electrostatic chuck may be used. If only paying attention to the holding force when holding the wafer block 10, thermoset resin (curing temperature is 50 to 150° C.) may be used.

Further, although the double-faced tape 1a has been described as a member to be separated with predetermined solvent, it is not limited to have such characteristics. However, it is preferably a member having characteristics of separating under a predetermined condition. For example, it may have characteristics that it is melted by heating and the adhesive strength thereof is weakened whereby the adhered wafer block 10 is separated, like the thermoplastic resin mentioned above.

<Second Holding Jig>

Next, the second holding jig 2 will be explained. The second holding jig 2 is a jig for holding one end of the wafer block 10, that is, holding the ABS 11a of the bar block 11 at the one end side thereof. The holding jig 2 adopts almost same configuration as that of the first holding jig 1. That is, the holding face is provided with a double-faced tape 2a, and the one end face (ABS 11a) of the wafer block 10 is adhered to the double-faced tape 2a whereby the wafer block 10 is held. The double-faced tape 2a has same characteristics as those of one adhered to the first holding jig 1. In other words, it has an area sufficient for covering all over the ABS 11a to be adhered, and has characteristics of elasticity, electrical conductivity, and adhesive strength being weakened with predetermined solvent. Note that these double-faced tapes 1a and 2a will be explained without being shown in other drawings.

The ABS 11a which is the one end face of the wafer block 10 held by the second holding jig 2 is polished by using a polisher, not shown, before being held. More specifically, the wafer block 10 is fixed to a predetermined jig (e.g., first holding jig 1), and the ABS of the magnetic head slider 12 is polished. Thereby, the MR height of the MR element 13 to be exposed on the ABS is previously adjusted, and the surface roughness of the ABS is also adjusted.

Further, although not shown, a driving device and a controlling device for drive-controlling the second holding jig 2 are also provided. By the driving device and the controlling device, the second holding jig 2 is moved so as to contact the end face of the wafer block 10 or is moved mainly in an up and down direction so as to perform positioning when cutting and treating the cut surfaces.

The second holding jig 2 holds a new one end face (ABS 11a) of the wafer block 10 after the wafer block 10 is cut and the cut surfaces are treated, as described later. In other words, it holds a new one end face (ABS 11a) generated each time the wafer block 10 is cut by adhering it with the double-faced tape 2a.

As described above, the both ends in a direction of arranging the bar blocks 11 in rows of the wafer block 10 are held by the first holding jig 1 and the second holding jig 2. Then, while maintaining the holding state, cutting and treating of the cur surfaces are performed by using the processor 3 described below.

For holding the one end of the wafer block 10 as described above, an adhesive such as thermoplastic resin or a physical device such as a vacuum chuck or an electrostatic chuck may be used instead of the double-faced tape 2a, same as the case of first holding jig 1. When using a physical device such as a vacuum chuck, it is preferable to be formed in a shape that the chuck portion will not contact magnetic head element parts formed in the wafer block 10.

<Processor>

Figure 3:
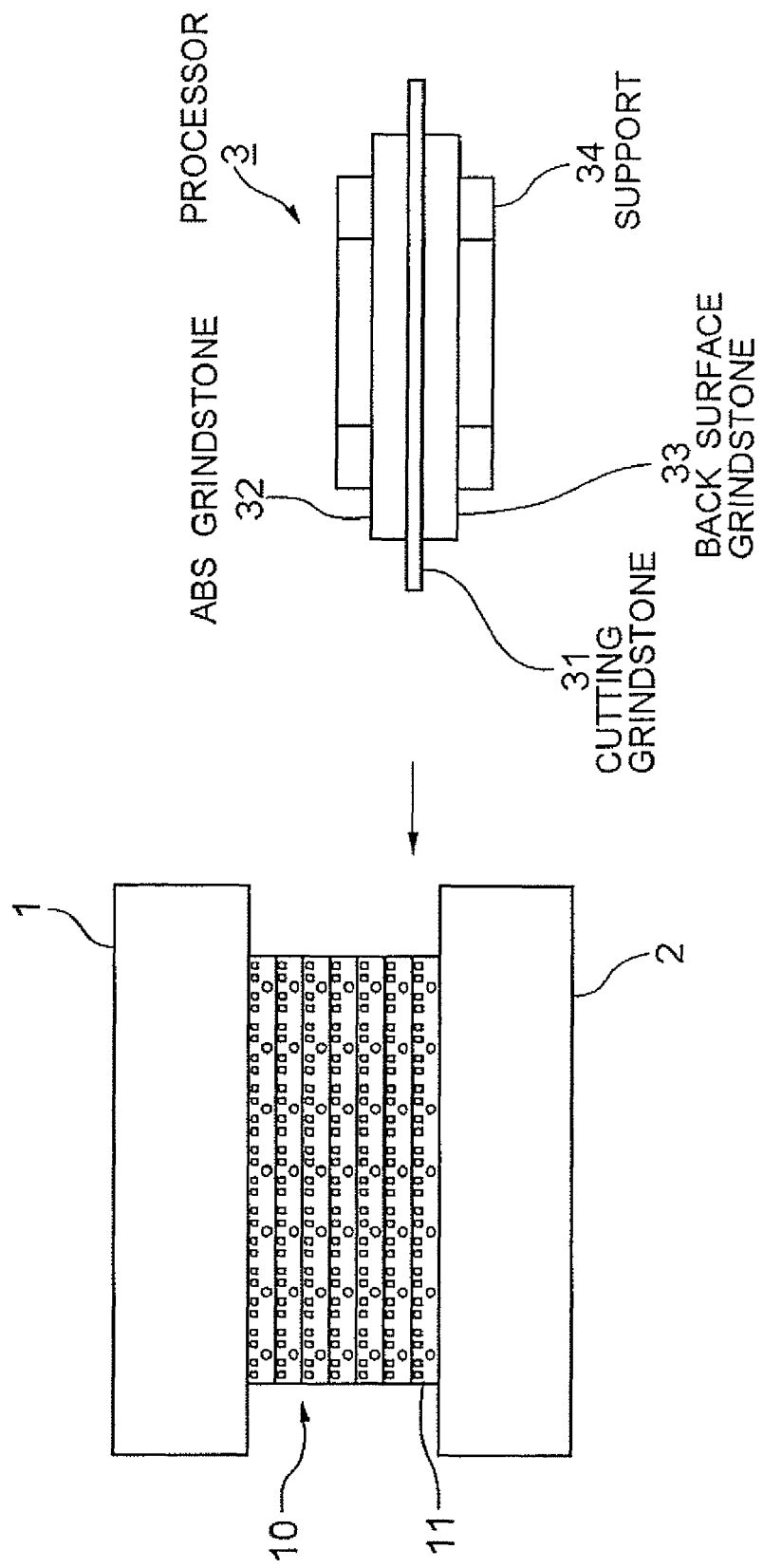
FIG. 3 is a configuration diagram of the apparatus for manufacturing magnetic head sliders, showing a state of cutting the wafer block.
Figure 4:
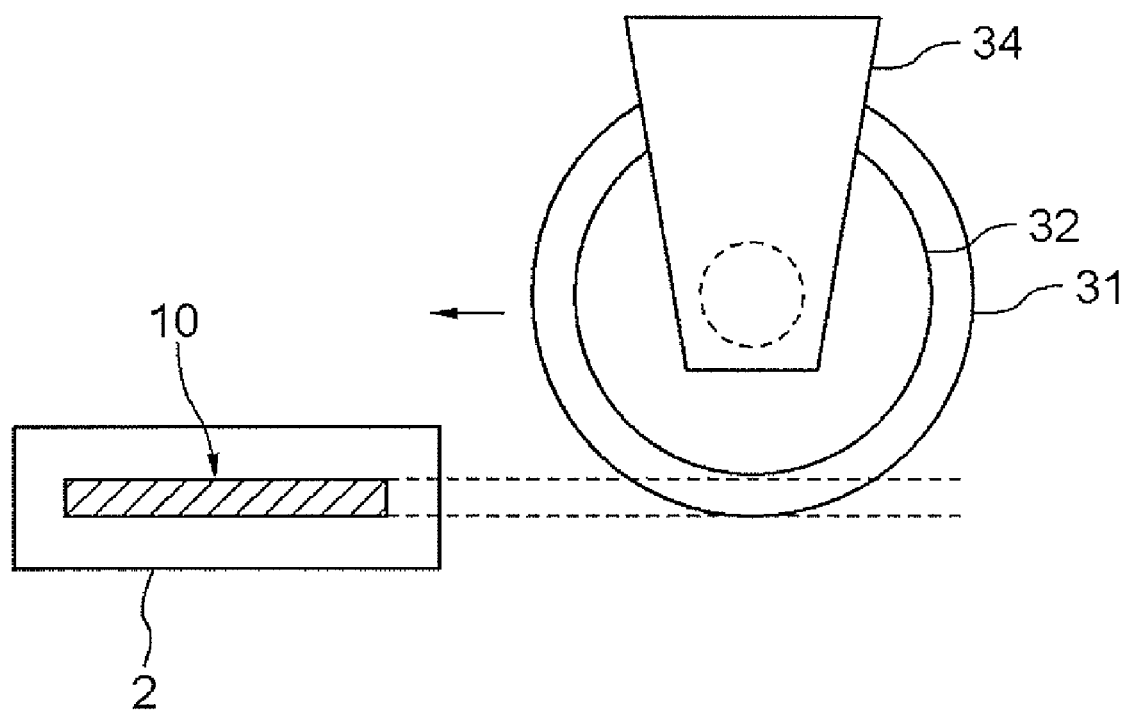
FIG. 4 is a diagram of FIG. 3 viewed from the above.
Figure 5:
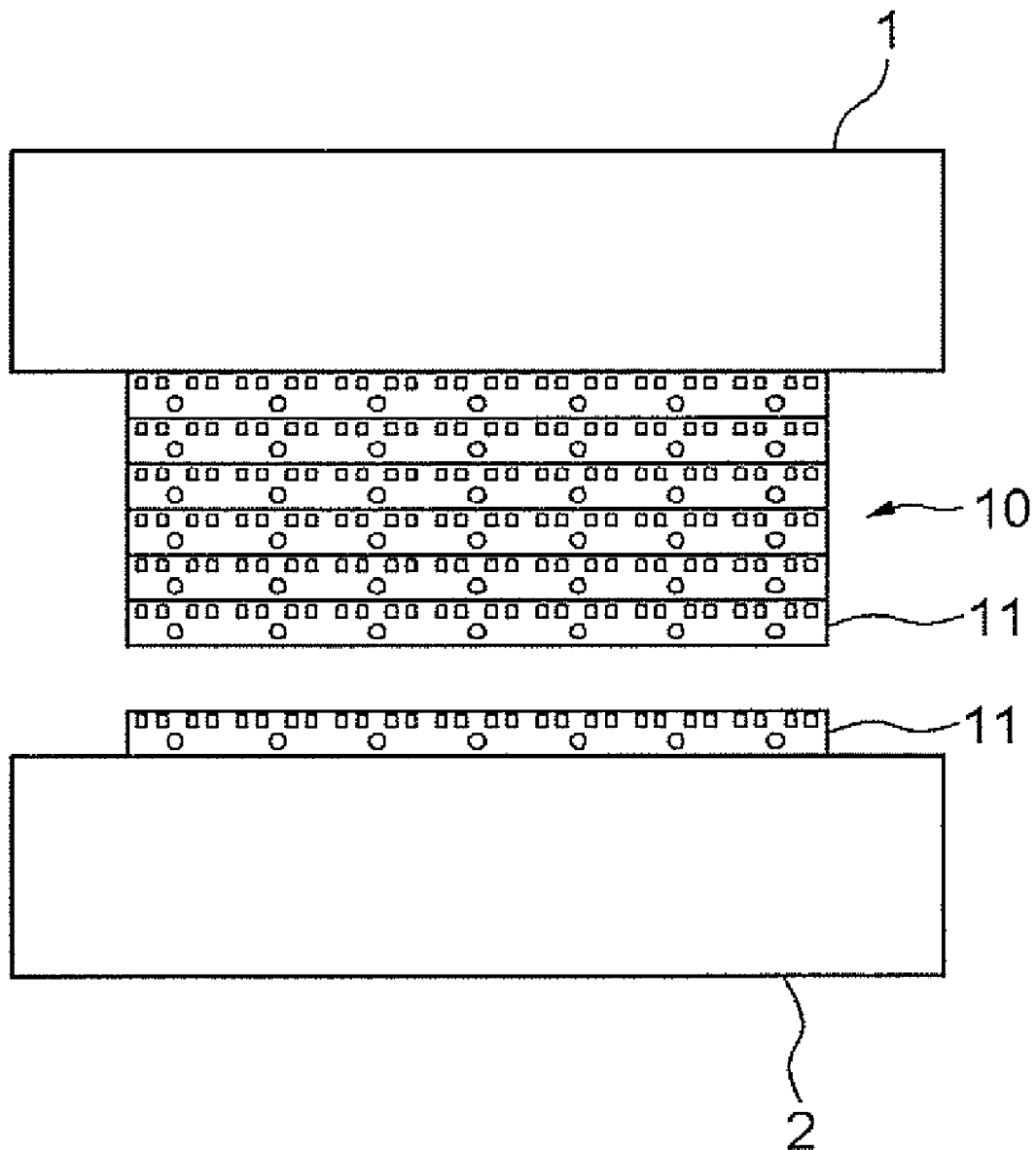
FIG. 5 is a configuration diagram of the apparatus for manufacturing magnetic head sliders, showing a state after cutting the wafer block.
Figure 6:
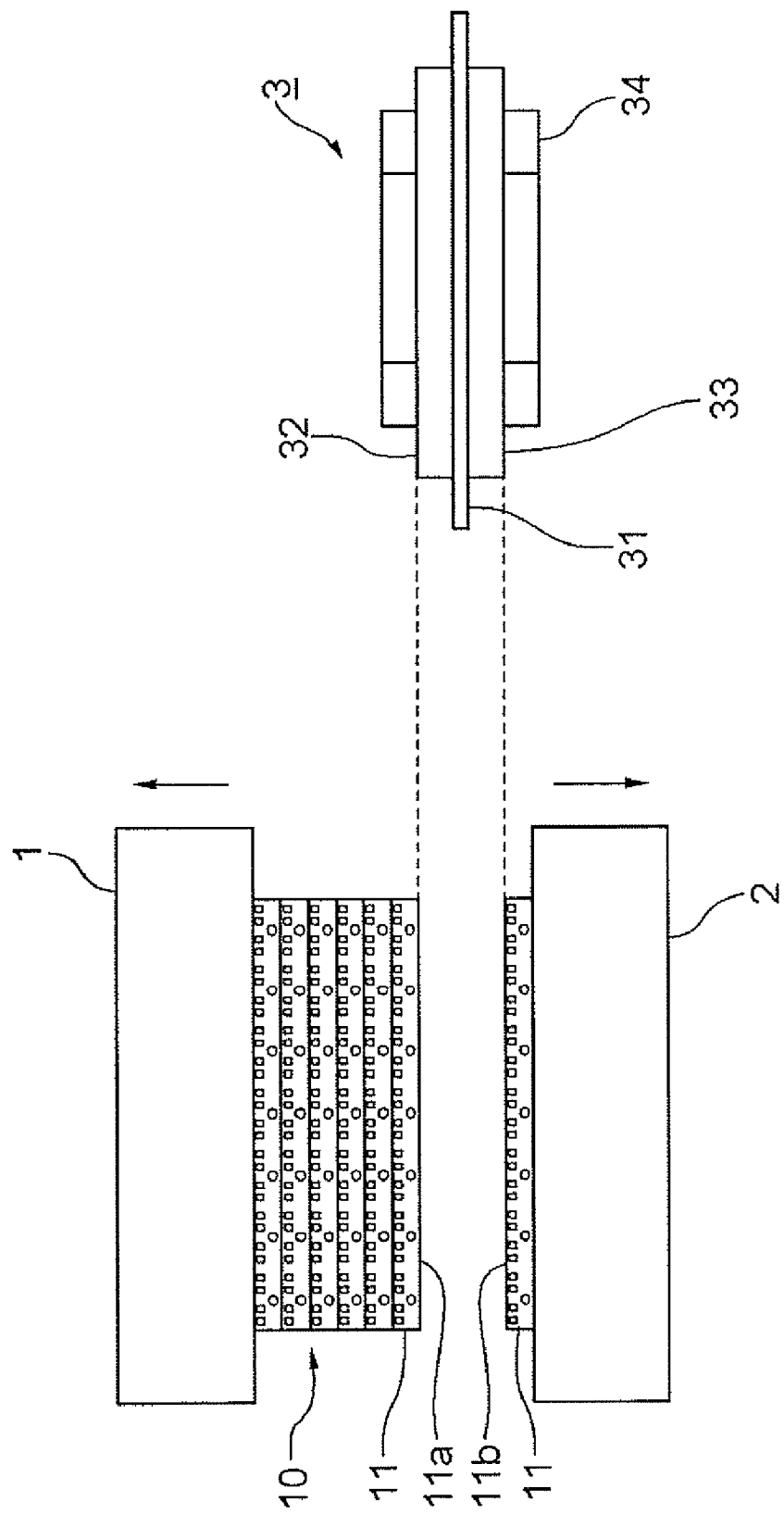
FIG. 6 is a configuration diagram of the apparatus for manufacturing magnetic head sliders, showing a state of treating cut surfaces.
Figure 7:
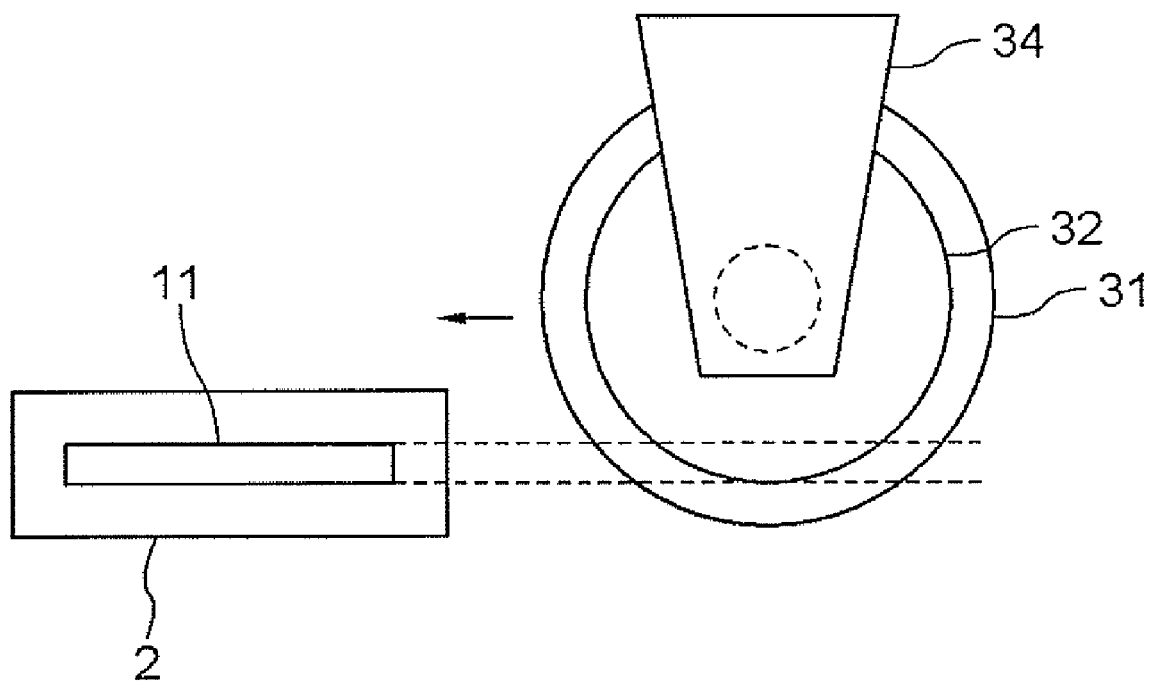
FIG. 7 is a diagram of FIG. 6 viewed from the above.

Next, the processor 3 will be explained with reference to FIGS. 3 to 8. FIG. 3 is a front view of the processor 3, showing a state of cutting the wafer block 10, and FIG. 4 is a partial sectional view of FIG. 3 seen from the above. FIG. 5 shows the cut-out wafer block 10, FIG. 6 shows a state of polishing, FIG. 7 is a top view thereof, and FIG. 8 is a partial enlarged view in which a part of a polisher is enlarged.

The processor 3 is a device for cutting out one bar block 11, positioned at one end side of the wafer block 10, from the wafer block 10 in which the both ends thereof are held by the holding jigs 1 and 2, and for polishing the cut surfaces formed on the cut-out bar block 11 and on the remaining wafer block 10. More specifically, as shown in FIGS. 3 and 4, the processor 3 consists of a cutting grindstone 31 (cutting device) for cutting the wafer block 10, an ABS grindstone 32 (cut surface treatment device) for polishing the ABS 11a which is the cut surface of the wafer block 10 side, a back surface grindstone 33 (cut surface treatment device) for polishing the back surface 11b which is the cut surface of the cut-out bar block 11 side, and a support 34 for supporting them. The grindstones 31, 32 and 33 are disk-shaped and stuck in three tiers, and the centers thereof are supported rotatably by the support 34, as shown in FIG. 4.

Although not shown, the grindstones 31, 32 and 33 supported by the support 34 are rotationally-driven by a rotating device. Further, a move-driving device, not shown, for moving the position of the processor 3 is also provided, so the processor 3 is moved to appropriate positions when cutting and when polishing, respectively. More detailed explanation will be given.

First of all, the cutting grindstone 31 is a thin grindstone of almost disk shape. It moves as the arrow shown in FIG. 3 while being rotationally driven by the rotating device, and cuts a part between rows of bar blocks 11 with the outer peripheral part thereof. At this time, it particularly cuts the boundary between the bar block 11 positioned at the one end of the wafer block 10 (the lowest bar block in FIG. 3) and a bar block positioned thereon. In other words, the cutting grindstone 31 cuts so as to separate the bar block 11 held by the second holding jig 2 from the wafer block 10.

In order to cut out magnetic head sliders 12 as many as possible from the wafer block 10 and to reduce the cost, thickness of the cutting grindstone must be thin. However, bending or chipping of the cutting grindstone 31 during treatment will result in a drop in yield, so the thickness cannot be reduced beyond a certain degree. Accordingly, it is preferable to use the cutting grindstone 31 having a grindstone width of 0.06 to 0.1 mm for example.

Further, the cutting grindstone 31 is interposed between the ABS grindstone 32 and the back surface grindstone 33 described later, and supported by the support 34. As shown in FIG. 4, the cutting grindstone 31 has a larger diameter than the ABS grindstone 32 and the back surface grindstone 33, so it is mounted such that the outer periphery thereof is protruded from the outer peripheries of the ABS grindstone 32 and the back surface grindstone 33. The protruded outer peripheral part moves along the cut part of the wafer block 10 as shown by the dotted lines in FIG. 4, to thereby perform cutting so as to cut out the bar block 11 from the wafer block 10. FIG. 5 shows a state after the wafer block 10 is cut in this way.

Next, the ABS grindstone 32 and the back surface grindstone 33 will be explained. Each of the grindstones 32 and 33 is formed in almost disk shape, and has at least one polishing face. In the example shown in FIGS. 3 and 4, the grindstones 32 and 33 are supported by the support 34 while interposing the cutting grindstone 31, and faces opposite to the interposing faces are polishing faces (cut surface treating part, polishing part). In other words, the processor 3, in which the three grindstones are stacked in layers, has such a configuration that the top surface in FIG. 3 serves as a polishing face with the ABS grindstone 32, and the bottom surface (back surface) serves as a polishing face with the back surface grindstone 33.

Further, the ABS grindstone 32 and the back surface grindstone 33 are formed to have almost same diameters which are smaller than the diameter of the cutting grindstone 31. Accordingly, the cutting grindstone 31 is interposed between the ABS grindstone 32 and the back surface grindstone 33 such that the outer periphery thereof is protruded, as shown in FIGS. 3 and 4. More specifically, they are formed to have smaller diameters than that of the cutting grindstone 31 such that the cutting grindstone 31 is protruded in the outer peripheral direction more than the width of the wafer block 10.

When polishing cut surfaces by the processor 3, the position of the processor 3 is moved and positions of the first and second holding jigs 1 and 2 are also moved respectively after cutting, whereby the distance between the cut surfaces is set to the distance between the respective polishing faces, that is, a thickness almost same as that of the three grindstones 31, 32 and 33, as shown by the dotted lines in FIG. 6. In other words, the processor 3 is moved to a position appropriate for polishing the cut surface by the move-driving device for moving the position of the processor 3.

Further, the moving device of the processor 3 moves the processor 3 in an arrow direction as shown in FIG. 7, whereby the respective polishing faces are inserted between the respective cut surfaces so as to face the respective cut surfaces and contact them. Therefore, as shown in FIG. 6, the polishing face of the ABS grindstone 32 contacts the ABS 11a which is the cut surface of the wafer block 10 side, and the polishing face of the back surface grindstone 33 contacts the back surface 11b of the cut-out bar block 11 side. Thereby, it is possible to polish the both cut surfaces almost simultaneously while the cut surfaces, formed by cutting, remain opposite to each other.

As shown in the partially enlarged sectional view of the processor 3 shown in FIG. 8B, a raised step of about 1 mm width (reference numerals 32a or 33a) is formed near the periphery of each polishing face of the ABS grindstone 32 and the back surface grindstone 33, and each grindstone 32 or 33 is in an almost cup shape. Accordingly, by polishing with the raised steps 32a and 33a, it is possible to prevent clogging and to realize fine polishing.

<Hold Releasing Device>

Next, the hold releasing device 4 will be explained with reference to FIG. 9. The hold releasing device 4 is a device used for separating the bar blocks 11 adhered to the first and second holding jigs 1 and 2 with the double-faced tapes 1a and 1b (see FIG. 2) as described above. More specifically, it is a container filled with prescribed solvent 42 for weakening the adhesive strength of the double-faced tapes 1a and 1b. Near the opening thereof, there is a holder member 43 to which the second holding jig 2 holding the bar block 11 is set. The holder member 43 has an opening on the upper face side, and a receiver 43a is formed in a dented shape with an inner bottom face. The dented receiver 43a is to be filled with the solvent 42 as described later. Hereinafter, the configuration will be explained with an example of separating the bar block 11 held by the second holding jig 2. However, it can be used for separating the last bar block 11 held by the first holding jig 1, and the configuration is same. In this Figure, the double-faced tape 2a adhered to the holding jig 2 is shown for explanation.

Figure 9:
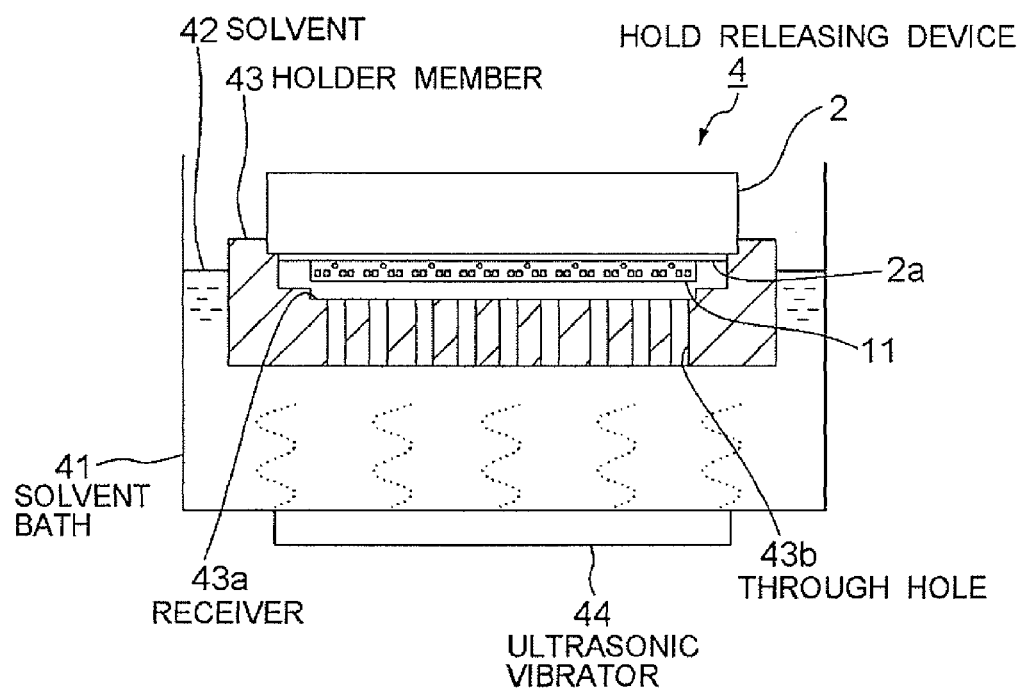
FIG. 9 is a configuration diagram of the apparatus for manufacturing magnetic head sliders, showing a state of releasing a holding state.

As shown in FIG. 9, near the opening of the holder member 43, the holding jig 2 can be set as a whole while holding the bar block 11 in which the cut surface has been polished on the lower side thereof. Therefore, when the second holding jig 2 is set, the bar block 11 and the double-faced tape 2a are dipped in the solvent 42 filled in the dented receiver 43a as described later. Note that the inner bottom face of the receiver 43a serves to receive the bar block 11 separated from the holding jig 2 as described later.

In the bottom face of the holder member 43, that is, in the receiver 43a, a plurality of through holes 43b penetrating to the outside are present. This enables the solvent 42 in the solvent bath 41 to flow into the receiver 43a of the holder member 43, so the dented receiver 43a is filled with the solvent 42 up to a level near to the opening of the holder member 43. Note that the opening of the holder member 43 is formed to have an area sufficient for dipping a part where the bar block 11 is adhered to the holding jig 2, that is, a part of the double-faced tape 2a.

Further, the bottom face of the solvent bath 41 is provided with an ultrasonic vibrator 44 for applying ultrasonic vibration to the solvent 42. Accordingly, ultrasonic vibration generated from the ultrasonic vibrator 44 passes through the through holes 43b formed in the holder member 43 mediated by the solvent 42, and is transmitted to the solvent 42 filled in the dented receiver 43a.

Thereby, the solvent 42 is added to the double-faced tape 2a with which the bar block 11 is adhered to the holding jig 2. Further, since ultrasonic vibration is applied, the adhesive strength of the double-faced tape 2a is weakened efficiently in a short period. Consequently, the bar block 11 is separated from the second holding jig 2.

In this way, the bar block 11, in which the ABS 11a and the back surface 11b have been polished, is separated from the second holding jig 2 and is accommodated in the receiver 43a of the holder member 43. Accordingly, by collecting the holder member 43 as a whole, the bar block 11 can be collected easily.

Note that the hold releasing device 4 shown in FIG. 9 is also used for separating the wafer block 10 held by being adhered to the first holding jig 1 described above, that is, the last bar block 11. Accordingly, by disposing the first holding jig 1 on the holder member 43 with the last bar block 11 facing downward and dipping the holder member 43 in the solvent 42 same as the second holding jig 2 shown in FIG. 9, it is possible to easily separate the bar block 11 from the first holding jig 1 without applying any mechanical stress.

<Other Configurations>

The apparatus for manufacturing magnetic head sliders also includes configurations for forming pieces of magnetic head sliders 12 from the bar block 11. For example, the apparatus includes a device for forming patterns on the ABS 11a by dry etching, and a device for cutting the bar block 11 into pieces of magnetic head sliders 12. These configurations are devices typically used, so the detailed explanations thereof are omitted.

[Operation]

Next, a method of manufacturing magnetic head sliders using the manufacturing apparatus described above will be explained with reference to the flowchart in FIG. 11 and FIGS. 1A to 10 described above.

First of all, as shown in FIGS. 1A and 1B, the wafer block 10 in which bar blocks 11 are arranged in a plurality of rows is cut out from the wafer W (step S1). Then, the both ends of the wafer block 10 are polished corresponding to the respective surfaces (step S2). That is, to the ABS 11a which is one end face positioned on the lower side in FIG. 2, polishing is performed to adjust the MR height and surface roughness as a flying surface, and to the back surface 11b which is the other end face positioned on the upper side in FIG. 2, polishing is performed to realize surface roughness appropriate for the mounting surface of a suspension.

Then, the polished both end faces of the wafer block 10 are held by the first and second holding jigs 1 and 2, respectively (step S3, holding step). More specifically, the back surface 11 positioned on the upper side is held by the first holding jig 1 and the ABS 11a positioned on the lower side is held by the second holding jig 2 with the double-faced tapes 1a and 2a adhered to the respective holding jigs 1 and 2.

Next, to the wafer block 10 in which the both ends are held, cutting is performed (step S4, cutting step). More specifically, as shown in FIG. 3, the cutting grindstone 31 of the processor 3 is positioned to the boundary between the bar block 11 positioned at the lowest layer of the wafer block 10 and a bar block positioned thereon. Then, the processor 3 moves as shown by the arrows in FIGS. 3 and 4 while rotating the cutting grindstone 3. Thereby, the wafer block 10 passes through the outer peripheral part which is the cutting part of the cutting grindstone 3 as shown by the dotted lines in FIG. 4, so the bar bock 11 held by the second holding jig 2 can be cut out from the wafer block 10. FIG. 5 shows a state after cutting. As shown in FIG. 5, the wafer block 10 is divided into the cut-out bar block 11 held by the second holding jig 2 and the remaining wafer block 10 held by the first holding jig 1.

Next, positioning is performed so as to polish the cut surfaces (step S5). For example, the first holding jig 1 moves upward and the second holding jig 2 moves downward as indicated by the arrows in FIG. 6 from the positions where cutting has been performed shown in FIG. 5. Corresponding to this, the processor 3 also moves vertically. Then, as shown by the dotted lines in FIG. 6, the distance between the opposite cut surfaces, that is, between the back surface 11b of the cut-out bar block 11 and a new ABS 11a which becomes one end face of the wafer block 10, is set to a distance almost same as that between the polishing face of the ABS grindstone 32 and the polishing face of the back surface grindstone 33 of the processor 3. At this time, it is possible to realize positioning appropriate for treating the cut surfaces by only moving the first and second holding jigs 1 and 2 and the processor 3 with reference to the positions where the wafer block 10 has been cut. Therefore, it is not required to perform additional adjustment by recognizing the positions of cut surfaces with a camera or the like.

Then, as shown by the arrow in FIG. 7, the processor 3 moves such that the polishing faces thereof are inserted between the cut surfaces. Thereby, the polishing face of the ABS grindstone 32 contacts the ABS 11a of the wafer block 10 held by the first holding jig 1, and polishing is performed so as to realize the MR height of the MR element exposed on the ABS 11a being an appropriate length and appropriate surface roughness. At the same time, the polishing face of the back surface grindstone 33 contacts the back surface 11b of the cut-out bar block 11 held by the second holding jig 2, and polishing is performed so as to realize appropriate surface roughness of the surface to be mounted on the suspension. As described above, the two surfaces, which are cut surfaces, are treated almost simultaneously (step S6, cut surface treating step).

In the cut-out bar block 11 (proceeds to (2) in step S7), the holding face side (ABS) has been polished before being held by the second holding jig 2, so polishing of the both surfaces has been completed. Accordingly, the bar block 11 is then separated from the second holding jig 2 (step S10). More specifically, as shown in FIG. 9, the holding part of the holding jig 2 to which the bar block 11 is adhered with the double-faced tape 2a is disposed to the holder member 43 of the solvent bath 41 and is dipped in the solvent 42, while being applied with ultrasonic vibration by the ultrasonic vibrator 44. As a result, the adhesive strength of the double-faced tape 2a is weakened by the solvent 42, whereby the bar block 11 is separated from the holding jig 2. By collecting the holder member 43 from the solvent bath 41, the separated bar block 11 is collected from the receiver 43a of the holder member 43. Thereby, the bar block 11, in which both of the ABS 11a and the back surface 11b are polished, is obtained.

Further, in step S7, to the remaining wafer block 10 after the bar block 11 is cut out, that is, the wafer block 10 held by the first holding jig 1 (proceed to (1) in step S7), if the wafer block 10 still has a part for cutting, which means if any bar block still remains therein (positive determination is step S8), the above-described steps are repeated. Accordingly, a surface which is a cut surface in step 4 described above and also a new one end face (ABS) of the wafer block 10 polished in step S6 is held by the second holding jig 2 with the double-faced tape 2a, as shown in FIG. 10 (step S9). Then, the bar block 11 of the lowest layer is cut out, and same steps such as polishing of cut surfaces are repeated (steps S4 to S9).

Then, after bar blocks 11 are continuously cut out from the wafer block 10, only one bar clock 11 remains at last. This means, when polishing of cut surfaces is performed in step S6, the wafer block 10 held by the first holding jig 1 becomes one bar block 11. In such a case, a cutting part does not remain any more in step S8, so the process proceeds to step S10. In this step, the bar block 11 held by the second holding jig 2 is separated, and the first holding jig 1 is also dipped in the solvent bath 41 whereby the bar block 11 lastly held by the first holding jig 1 is separated. Note that in the last bar block 11 held by the first holding jig 1, the back surface 11, which is the surface held, has been treated before being held in step S2 and the ABS 11a has also been polished in step S6, so the both surfaces have been polished.

Then, to the bar block 11 in which the both surfaces have been polished, processes of forming magnetic head sliders 12 such as forming ABS by dry etching and cutting into pieces of sliders are performed (step S11).

In this way, it is possible to polish the opposite cut surfaces formed after cutting out the bar block 11 from the wafer block 10, that is, the back surface 11b on the cut-out bar block 11 side and the ABS 11a on the wafer block 10 side, almost simultaneously in one step by using one processor 3. Further, by only adjusting the position of the processor 3 with respect to the wafer block 10 before cutting, the position of the processor 3 with respect to the treating surfaces can be set easily with reference to the position thereof. Accordingly, it is possible to simplify the manufacturing steps and the manufacturing apparatus and to reduce the manufacturing time. Further, since cutting and treating of the cut surfaces are performed while holding the cut-out portion forming magnetic head sliders, it is possible to prevent treatment of the cut-out portion by handling it separately and to stabilize the treatment to thereby prevent damage on the products. Therefore, it is possible to manufacture magnetic head sliders of high quality at low cost.

[Variation]

Although the processor 3 of three-tiered structure including the cutting grindstone 31, the ABS grindstone 32 and the back surface grindstone 33 has been exemplary shown above, the processor 3 is not limited to this configuration. The cutting grindstone 31 and a set of the ABS grindstone 32 and the back surface grindstone 33 may be configured as different devices respectively. In other words, the processor 3 may be configured to include a cutter having the cutting grindstone and a polisher having the ABS grindstone 32 and the back surface grindstone 33.

Further, in configuring the polisher, it is not necessary to include two grindstones consisting of the ABS grindstone 32 and the back surface grindstone 33. For example, one grindstone in which polishing parts are formed on the front and back surfaces (both surfaces) thereof may be used. Even with this configuration, opposite cut surfaces can be polished by the both surfaces almost simultaneously.

In contrast, in the configuration in which treatment of cut surfaces is performed by the ABS grindstone 32 and the back surface grindstone 33, the respective grindstones 32 and 33 are not limited to be configured integrally by stacking. It is acceptable to provide polishers mounting the grindstones 32 and 33 separately, and insert them in between opposite cut surfaces so as to perform polishing almost simultaneously.

Further, although the case of polishing cut surfaces has been exemplary shown above, another treatment may be performed. For example, treatment of forming prescribed patters on cut surfaces or applying prescribed materials may be applicable. In such cases, the processor 3 should be formed to have a configuration capable of performing each treatment.

INDUSTRIAL APPLICABILITY

The present invention is usable as a part of an apparatus or a method for manufacturing magnetic head sliders to be mounted on hard disk drives, and has industrial applicability.

What is claimed is:

1. An apparatus for manufacturing magnetic head sliders cut from a block member, comprising:
   a plurality of holding devices that hold ends of the block member;
   a cutting device that cuts out a portion of the block member, in which a magnetic head slider is to be formed, from the block member; and
   a cut surface treatment device having cut surface treating parts on front and back surfaces thereof that simultaneously treat each of two opposite cut surfaces which form two predetermined surfaces of the magnetic head sliders,
   wherein when the cut surfaces are treated by the cut surface treatment device, the holding devices hold the block member and the cut-out portion respectively such that a distance between the two opposite cut surfaces is set approximately equal to a distance between the cut surface treating parts of the cut surface treatment device.

2. The apparatus for manufacturing the magnetic head sliders as claimed in claim 1, wherein the cutting device is provided between the cut surface treating parts formed on the front and back surfaces of the cut surface treatment device.

3. The apparatus for manufacturing the magnetic head sliders as claimed in claim 1, wherein the cut surfaces are an ABS and a back surface of the magnetic head sliders respectively, and the cut surface treating parts included in the cut surface treatment device are polishing parts.

* * * * *